United States Patent Office 2,922,805
Patented Jan. 26, 1960

2,922,805

CYCLOPENTADIENYLMETAL HALIDE COMPOUNDS

Daniel Kaufman, Edison Township, N.J., assignor to National Lead Company, New York, N.Y., a corporation of New Jersey No Drawing. Application June 5, 1957
Serial No. 663,606

6 Claims. (Cl. 260—439)

This invention relates in general to metal organic compositions and more specifically to iron-carbon, nickel-carbon and cobalt-carbon bonded compositions.

This application is a continuation-in-part of my co-pending applications Serial No. 588,599, filed June 1, 1956, and Serial No. 597,341, filed July 12, 1956, both now abandoned.

A number of metal-carbon bonded compositions have previously been prepared and among these are bis-cyclopentadienyliron, bis-cyclopentadienylnickel and bis-cyclopentadienecobalt. Bis-cyclopentadienyliron and its method of preparation is described by T. J. Kelly et al. in Nature, vol. 168, page 1031, in 1951. Bis-cyclopentadienylnickel and bis-cyclopentadienylcobalt and their methods of preparation are described in G. Wilkinson et al. in the Journal of American Chemical Society, vol. 76, page 1970, in 1956.

Such compositions are of interest as catalytic agents and as intermediates in various organic reactions for the preparation of other organic compounds. It is desirable, therefore, to produce derivatives of such compositions so that these compositions may have wider applications in various organic systems.

An object of the instant invention, therefore, is to produce derivatives of bis-cyclopentadienyliron, nickel and cobalt compounds. Another object is to produce derivatives which will have applications other than those of the bis-cyclopentadienyliron, nickel and cobalt themselves. A still further object is to produce derivatives which under certain conditions are more reactive than bis-cyclopentaenyliron, nickel or cobalt. These and other objects will become more apparent from the following more complete description of the instant invention.

Broadly, this invention contemplates an aliphatic compound comprising one cyclopentadienyl group and one aliphatic group attached to a metal atom, said metal atom being selected rfom the group consisting of iron, nickel and cobalt, said aliphatic group being a 5 membered carbon ring, said aliphatic group containing from 2 to 4 halogens attached to said group as additions to said aliphatic group, said halogens selected from the group consisting of chlorine, bromine and iodine. This compound is prepared by reacting bis-cyclopentadienyliron, nickel or cobalt with chlorine, bromine or iodine in substantially the stoichiometric quantities. A preferred embodiment of the instant invention is to suspend the bis-cyclopentadienyl metal in an inert solvent and react the suspension with the halogen.

Bis-cyclopentadienyl metal compounds are fairly soluble in most inert solvents, the most readily available being $CCl_4$, $CHCl_3$, hexane, cyclohexane, petroleum ether and tetrachloroethane.

The reaction is simple and straightforward. The halogen is merely reacted with the bis-cyclopentadienyl metal and the derivatives are formed. Usually the stoichiometric quantities of the halogen are used, however, a slight excess may be employed in order to obtain a more complete reaction. The reaction is usually run under atmospheric pressure but may be run under pressure if desired. The reaction is usually carried out at room temperature, however, the temperature employed is dependent upon either the solvent or pressure used. These compounds are readily susceptible toward oxidation by the atmosphere and, therefore, they are usually protected from the atmosphere by employing an inert gas either as the reaction is being carried out or by filtering the product formed under an inert atmosphere.

In carrying out the reaction between the bis-cyclopentadienyl metal and the halogen, two derivatives may be formed. Apparently only one of the cyclopentadienyl rings is attacked and the halogen is attached thereto in multiples of two. The first derivative which is formed, and is isolable if desired, is cyclopentadienyl (dihalocyclopentenyl) metal. This derivative is then further halogenated if desired to produce another isolable derivative which containes 4 halogens, that is, cyclopentadienyl (tetrahalocyclopentanyl) metal.

As bis-cyclopentadienyl metal is reacted with chlorine, bromine or iodine, the derivatives are formed stepwise, i.e. cyclopentadienyl (dihalocyclopentenyl) metal is formed first and then as more halogen is added cyclopentadienyl (tetrahalocyclopentanyl) metal is produced. The reaction may be stopped at any time if desired and the particular derivatives produced are directly dependent upon the amount of halogen added. Since chlorine is most conveniently added as a gas by bubbling the gas through the solution, a slight excess is usually employed to obtain sufficient contact between the chlorine gas added and the bis-cyclopentadienyl metal employed. Both bromine and iodine are most conveniently employed in solution and, therefore, a much better contact is obtained between the bromine or iodine added and the bis-cyclopentadienyl metal employed and substantially the theoretical quantity of bromine or iodine is required to produce either one of the derivatives desired.

Both of these derivatives contain one cyclopentadienyl group and one aliphatic 5 membered carbon ring both of which are attached to a metal atom. Moreover, these derivatives also contain either 2 or 4 halogens respectively, selected from the group consisting of chlorine, bromine and iodine, said halogens being attached to the aliphatic 5 membered carbon ring.

According to the instant invention, the following reaction takes place in sequence.

Formation of cyclopentadienyl (dihalocyclopentenyl) metal:

(1)  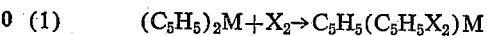

Formation of cyclopentadienyl (tetrahalocyclopentanyl) metal:

(2)  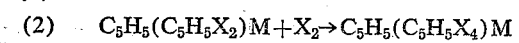

From the above equation it is apparent that the product of Equation 1 is formed when one mole of halogen is reacted with one mole of $(C_5H_5)_2M$ and that the product of Equation 2 is formed when one mole of $(C_5H_5)_2M$ is reacted with 2 moles of halogen.

In order to further illustrate the instant invention, the following examples are presented which show in detail a method for preparation of some of the derivatives contemplated by the instant invention.

*Example 1*

0.6 gram of bis-cyclopentadienyliron was dissolved in 100 ml. of $CCl_4$. Chlorine gas was bubbled through the solution at a rate of approximately 50 ml./min. for 2 minutes. During the reaction the mixture was protected from the atmosphere by passing argon gas over the surface of the vessel. A blue-green precipitate was formed and was removed by filtration. The precipitate removed was cyclopentadienyl (dichlorocyclopentenyl) iron and weighed 0.2 gram.

The precipitate was insoluble in ether and carbon tetrachloride.

The theoretical iron was 21.7% and the actual iron obtained was 21.2%.

Example 2

0.5 gram of bis-cyclopentadienyliron was dissolved in 100 ml. of diethyl ether and 1 ml. of liquid bromide was added. A dark green precipitate formed and was removed from the solution by filtration. During the filtration operation, an argon gas atmosphere was maintained over the product to prevent oxidation. The 0.32 gram of the dark green crystals of cyclopentadienyl (dibromocyclopentenyl) iron was recovered.

Theoretical iron was 16.1%; actual iron was 15.8%.

Example 3

0.44 gram of bis-cyclopentadienyliron was dissolved in 50 ml. of carbon tetrachloride. To this was added .07 gram of iodine dissolved in 75 ml. of carbon tetrachloride. The iodine solution was poured into the bis-cyclopentadienyliron solution and a brown colored product was obtained immediately with no iodine color in the supernatant liquor. The solution was placed in a refrigerator at 0° C. overnight. The precipitate was removed by filtration. The residue was washed with carbon tetrachloride and the excess solvent removed under vacuum. A black colored residue was obtained weighing 0.87 gram. Analysis of the mixture indicated it to be a mixture of cyclopentadienyl (diiodocyclopentenyl) iron and cyclopentadienyl (tetraiodocyclopentanyl) iron. The mixture of diiodo and tetraiodo compounds was formed because an excess of iodine was used to form the diiodo but insufficient to form the tetraiodo compound.

Example 4

In order to prepare cyclopentadienyl (tetrabromocyclopentanyl) iron the same procedure as that described in Example 2 was repeated except that 2 ml. of liquid bromine was added instead of 1 ml. The mixture was agitated for 5 minutes and a black precipitate was formed weighing 0.4 gram. The product was identified as cyclopentadienyl (tetrabromocyclopentanyl) iron.

The theoretical iron equivalent was 11.1%; the actual iron was 12.1%.

The theoretical carbon was 23.7%; the actual carbon 22.7%.

It should be noted that in this example the second derivative, that is, cyclepentadienyl (tetrabromocyclopentanyl) iron was produced instead of the first derivative, that is, cyclopentadienyl (dibromocyclopentenyl) iron, since the theoretical amount of bromine to form the tetrabromo compound was employed.

Example 5

0.5 gram of bis-cyclopentadienylnickel was dissolved in 100 ml. of carbon tetrachloride and reacted with 0.75 gram of iodine dissolved in 150 ml. of carbon tetrachloride. This was warmed to 40° C. and immediately placed in a refrigerator at 0° C. overnight. A black precipitate was filtered off under a protective argon atmosphere and washed with carbon tetrachloride and dried in a vacuum dessicator. 0.2 gram of a cyclopentadienyl (tetraiodocyclopentanyl) nickel was obtained.

Example 6

0.4 gram of bis-cyclopentadienylnickel was dissolved in 100 ml. of carbon tetrachloride. Chlorine gas was bubbled through the mixture at the rate of 50 ml./min. for 5 minutes. The chlorinated mixture was placed in a refrigerator at 0° C. overnight. The cooled mixture was then filtered under a protective argon atmosphere. 0.25 gram of a tan precipitate of cyclopentadienyl (tetrachlorocyclopentanyl) nickel was obtained.

Example 7

0.5 gram of bis-cyclopentadienylcobalt was dissolved in 100 ml. of carbon tetrachloride. 1 ml. of bromine in 20 ml. of carbon tetrachloride was added. The mixture was then placed in a refrigerator overnight at 0° C., filtered under protective argon atmosphere and 0.2 gram of a dark blue product was obtained which was cyclopentadienyl (dibromocyclopentenyl) cobalt.

Example 8

0.5 gram of bis-cyclopentadienylnickel was dissolved in 100 ml. of carbon tetrachloride. 1 ml. of bromine and 10 ml. of carbon tetrachloride were added to the nickel compound. A dark red precipitate was obtained which was filtered off under a protective inert atmosphere. The precipitate weighed 0.21 gram and was cyclopentadienyl (dibromocyclopentenyl) nickel.

Example 9

0.4 gram of bis-cyclopentadienylcobalt was dissolved in 100 ml. carbon tetrachloride and chlorine gas was bubbled through the mixture for 2 minutes at a rate of 50 ml./min. A dark green precipitate was filtered off under a protective atmoshpere. A weight of 0.18 gram of product was recovered and it was identified as cyclopentadienyl (dichlorocyclopentenyl) cobalt.

From the above description and by the examples presented, a new type of derivative of bis-cyclopentadienyl-iron, nickel or cobalt has been produced. The derivatives formed contain an entirely new and novel type of bond, that is, a stable aliphatic carbon-metal bond for the iron, nickel and cobalt compounds. Such a new bond is far more reactive than the cyclopentadienyl metal bond and, therefore, is more useful in free radical type reactions, in the production of various polymers and in other organic systems.

In addition to preparing cyclopentadienyl (dihalocyclopentenyl) iron, nickel or cobalt or cyclopentadienyl (tetrahalocyclopentanyl) iron, nickel or cobalt according to the instant invention, it is also contemplated to further halogenate these compounds to form another new type of compound. This new compound has aromatic properties and comprises one cyclopentadienyl group and two halogens attached to each metal atom, said metal selected from the group consisting of iron, nickel and cobalt. The composition of the instant invention is prepared by halogenating the previously prepared compounds, i.e. those selected from the group consisting of cyclopentadienyl (dihalocyclopentenyl) iron, nickel or cobalt and cyclopentadienyl (tetrahalocyclopentanyl) iron, nickel and cobalt. In carrying out the process of the instant invention, chlorine, bromine or iodine may be used for halogenating the derivatives but fluorine should be avoided becaues of its reactive nature.

It has been found that the new composition of the instant invention is formed when a halogen is employed in amount from 50% to 200% excess over that required to form the cyclopentadienyl (tetrahalocyclopentanyl) iron, nickel, or cobalt.

The halogenation of either the cyclopentadienyl (dihalocyclopentenyl) metal or the cyclopentadienyl (tetrahalocyclopentanyl) metal takes place rapidly and the halogenated product produced forms a solid in the bottom of the vessel. This solid is then removed from the oily liquid formed by the reaction by any simple well known means. The reaction is straightforward. The halogen is merely added to the previously prepared aliphatic compound and the reaction takes place rapidly. No precautions against atmospheric oxidation are necessary. Normally room temperature is employed for convenience.

In order to more fully describe the formation of the aromatic compounds of the instant invention, the following examples are presented.

Example 10

One gram of the blue-green colored cyclopentadienyl (dichlorocyclopentenyl) prepared in Example 1 was dissolved in 50 ml. of diethyl ether and chlorine gas at a rate of 50 ml. per min. was passed through the mixture for 3 minutes. An azure-blue colored ether insoluble product was readily formed in the vessel. 0.5 gram of the blue product was recovered by filtration and washing. The product recovered contained one 5 membered carbon ring and 2 chlorines attached to each iron atom and was identified as monocyclopentadienyliron dichloride. The analysis obtained is as follows:

|  | C | H | Fe | Cl |
|---|---|---|---|---|
| Theoretical | 31.3 | 2.6 | 29.1 | 37.0 |
| Actual | 31.3 | 2.8 | 29.2 | 37.4 |

Example 11

Cyclopentadienyl (tetrachlorocyclopentanyl) iron was used as the starting material in this run and was prepared in a similar manner as the cyclopentadienyl (dichlorocyclopentenyl) iron described in Example 1 except that twice the quantity of chlorine gas was added and the chlorinated mixture was placed in a refrigerator at 0° C. overnight. A dark blue colored product was recovered the next morning.

One gram of the dark blue cyclopentadienyl (tetrachlorocyclopentanyl) iron was dissolved in 75 ml. of carbon tetrachloride. Chlorine gas was bubbled through the solution at the rate of 50 ml. per minute for two minutes. The treated solution was set aside overnight. The blue solid proved to be identical to the product obtained in Example 10 above.

Example 12

One gram of the dark green colored cyclopentadienyl (dibromocyclopentenyl) iron prepared in Example 2 was dissolved in 200 ml. of diethyl ether and chlorine gas at the rate of 50 ml. per min. was bubbled through the solution for 3 minutes. Monocyclopentadienyliron dichloride (0.3 gram) was obtained. The product had one cyclopentadienyl and two chlorides attached to each iron. It was the same product as that described in Example 10.

Example 13

The cyclopentadienyl (dichlorocyclopentenyl) cobalt prepared in Example 9 was halogenated in the same manner as that described in Example 10 and the product obtained was identified as monocyclopentadienylcobalt dichloride.

Example 14

In this run cyclopentadienyl (tetrabromocyclopentanyl) cobalt was prepared in the same manner as that used in Example 7 except that 2 ml. of liquid bromine dissolved in carbon tetrachloride were used in place of 1 ml.

One gram of the cyclopentadienyl (tetrabromocyclopentanyl) cobalt dissolved in diethyl ether was then reacted with 3 ml. of bromine dissolved in 50 ml. carbon tetrachloride. After several minutes a blue precipitate appeared which was recovered from the solution by filtration. This product was identified as monocyclopentadienylcobalt dibromide.

Example 15

Cyclopentadienyl (tetraiodocyclopentanyl) nickel was prepared by reacting bis-cyclopentadienylnickel with iodine dissolved in carbon tetrachloride. The mixture was refluxed for 10 minutes then cooled and allowed to stand overnight.

One gram of the cyclopentadienyl (tetraiodocyclopentanyl) nickel dissolved in 200 ml. of carbon tetrachloride was then treated with 2 grams of iodine dissolved in 100 ml. of carbon tetrachloride and the product was identified as monocyclopentadienylnickel diiodide.

Example 16

In this run cyclopentadienyl (tetrabromocyclopentanyl) nickel was prepared by reacting bis-cyclopentadienylnickel with liquid bromine and was allowed to stand overnight in a refrigerator at 0° C.

One gram of the cyclopentadienyl (tetrabromocyclopentanyl) nickel dissolved in 200 ml. of carbon tetrachloride was then further halogenated by bubbling chlorine gas through the solution at the rate of 50 ml. per min. for two minutes and monocyclopentadienylnickel dichloride was obtained.

From the above description and by the examples shown, new and novel compounds of iron, nickel and cobalt have been obtained. These compounds contain one cyclopentadienyl group and two halogens attached to each metal atom. They are resistant to air oxidation, are non-reactive with water and thermally stable.

The usefulness of such compounds becomes apparent from the properties exhibited by the compounds produced. For example, these compounds may be used to treat cloth to render the cloth more resistant toward chemical and physical changes. For instance, one gram of monocyclopentadienyliron dichloride prepared in Example 10 was dissolved in an ethanol-water mixture and was used to treat viscose rayon cloth. The cloth was dipped into the solution for 10 minutes at 40° C. The treated cloth was then dried at 60° C. for one hour and then washed with a dilute neutral soap solution, rinsed with water and dried. The dried cloth was found to be wrinkle resistant and resistant toward degradation upon laundering.

Such compounds are useful for a variety of other purposes such as polymerization agents, catalysts, coloring agents for pigments, and for other organic reactions, including oxidation in combustion engines and the like. These compositions are simple to prepare and in general can be stabilized for wider application in various organic systems than the compositions from which they are prepared.

While this invention has been described and illustrated by the examples shown, it is not intended to be strictly limited thereto, and other modifications and variations may be employed within the scope of the following claims.

I claim:

1. A metal organic compound consisting of (A) one cyclopentadienyl group, $C_5H_5$, (B) a metal atom and (C) two halogens, said halogens and said cyclopentadienyl group all being directly bonded to said metal atom, said metal being selected from the group consisting of iron, nickel and cobalt, and said halogens being selected from the group consisting of chlorine, bromine and iodine.

2. Compound according to claim 1 in which the metal is iron.

3. Compound according to claim 1 in which the metal is nickel.

4. Compound according to claim 1 in which the metal is cobalt.

5. A method for the preparation of a metal organic compound having one cyclopentadienyl group and two halogens all of which are directly bonded to a metal atom, said metal being selected from the group consisting of iron, nickel and cobalt, which comprises reacting cyclopentadienyl (tetrahalocyclopentanyl) metal with a halogenating agent being selected from the group consisting of chlorine, bromine and iodine, the amount of halogenating agent employed being from 50% to 200% of the theoretical amount used to form the cyclopentadienyl (tetrahalocyclopentanyl) metal from the bis-cyclopentadienyl metal compound.

6. A method for preparation of a metal organic compound having one cyclopentadienyl group and two halogens all of which are directly bonded to a metal atom, said metal being selected from the group consisting of iron, nickel and cobalt, which comprises reacting 1 mole of cyclopentadienyl (tetrachlorocyclopentanyl) metal with from 1 to 4 moles of a halogenating agent being selected from the group consisting of chlorine, bromine and iodine.

References Cited in the file of this patent

Pauson: Quarterly Reviews, vol. 9, 1955, pp. 408 and 413.

Nesmeyanova et al.: Chem. Abstracts, vol. 50, February 25, 1956, p. 2558. Abstracted from Doklady Akad., Nauk. S.S.S.R., vol. 100, pp. 1099–1101, 1955.